US012603356B2

(12) United States Patent
Stude et al.

(10) Patent No.: US 12,603,356 B2
(45) Date of Patent: Apr. 14, 2026

(54) MULTI-LAYER PROTECTION ELEMENT FOR A BATTERY

(71) Applicant: H.K.O. ISOLIER—UND TEXTILTECHNIK GMBH, Oberhausen (DE)

(72) Inventors: Ulrich Stude, Rodeberg-Struth (DE); Carsten Stöckmann, Oberhausen (DE)

(73) Assignee: H.K.O. ISOLIER- UND TEXTILTECHNIK GMBH, Oberhausen (DE)

( * ) Notice: Subject to any disclaimer, the term of this patent is extended or adjusted under 35 U.S.C. 154(b) by 720 days.

(21) Appl. No.: 17/791,284

(22) PCT Filed: Jan. 8, 2021

(86) PCT No.: PCT/EP2021/050208
§ 371 (c)(1),
(2) Date: Jul. 7, 2022

(87) PCT Pub. No.: WO2021/140167
PCT Pub. Date: Jul. 15, 2021

(65) Prior Publication Data
US 2023/0035826 A1      Feb. 2, 2023

(30) Foreign Application Priority Data

Jan. 10, 2020    (DE) ..................... 10 2020 000 093.2
Jan. 14, 2020    (DE) ..................... 10 2020 000 158.0
(Continued)

(51) Int. Cl.
*H01M 10/658* (2014.01)
*B32B 5/02* (2006.01)
(Continued)

(52) U.S. Cl.
CPC ........... *H01M 10/658* (2015.04); *B32B 5/022* (2013.01); *B32B 5/026* (2013.01); *B32B 5/26* (2013.01);
(Continued)

(58) Field of Classification Search
CPC ............. H01M 10/658; H01M 10/625; H01M 50/204; H01M 50/293; H01M 50/325;
(Continued)

(56) References Cited

U.S. PATENT DOCUMENTS 4,323,620 A     4/1982   Iwabuchi et al.
4,505,977 A     3/1985   Hasenauer et al.
(Continued)

FOREIGN PATENT DOCUMENTS

AT          518161 A4      8/2017
CN       101910702 A      12/2010
(Continued)

OTHER PUBLICATIONS

Fujii, Mikiya "The Introduction of Ceramic Fiber Products as Thermal Insulation and the Recent Trend for Them" (Includes Translation) Dec. 31, 2008.
(Continued)

*Primary Examiner* — Lisa S Park
(74) *Attorney, Agent, or Firm* — Jason H. Vick; Amped IP LLC

(57)                ABSTRACT

A multi-layer protection element for thermal insulation of a battery, a battery with such a protection element and the use of the protection element to filter gases escaping in case of fire and to prevent the escape of flames and/or sparks are proposed. The highly gas-permeable protection element comprises a carrier layer of a fabric and a compressible fibre layer in the form of a sewn non-woven fabric. The protection element is arranged between at least one battery cell and a
(Continued)

Figure 1A:
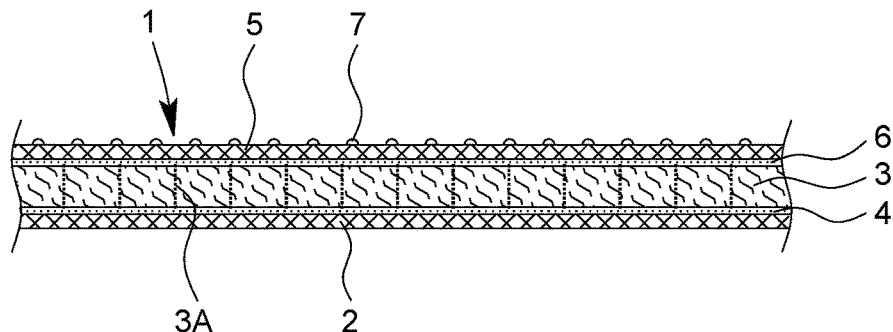

housing wall of the battery and covers an outlet of the housing wall on the inside. This enables good pressure compensation in the event of fire and/or a short circuit, wherein escaping gases are filtered in particular through the fibre layer and the escape of flames or sparks through the outlet is prevented.

21 Claims, 3 Drawing Sheets

(30)        Foreign Application Priority Data

| | | | |
|---|---|---|---|
| May 29, 2020 | (DE) | .................... | 10 2020 003 262.1 |
| Jun. 4, 2020 | (DE) | .................... | 10 2020 003 369.5 |
| Aug. 13, 2020 | (DE) | .................... | 10 2020 004 937.0 |

(51) Int. Cl.

| | |
|---|---|
| *B32B 5/26* | (2006.01) |
| *B32B 7/12* | (2006.01) |
| *F16L 59/02* | (2006.01) |
| *H01M 10/625* | (2014.01) |
| *H01M 50/204* | (2021.01) |
| *H01M 50/293* | (2021.01) |
| *H01M 50/325* | (2021.01) |
| *H01M 50/342* | (2021.01) |

(52) U.S. Cl.
CPC .............. *B32B 7/12* (2013.01); *F16L 59/026* (2013.01); *F16L 59/029* (2013.01); *H01M 10/625* (2015.04); *H01M 50/204* (2021.01); *H01M 50/293* (2021.01); *H01M 50/325* (2021.01); *H01M 50/3425* (2021.01); *B32B 2262/10* (2013.01); *B32B 2262/101* (2013.01); *B32B 2262/144* (2021.05); *B32B 2307/306* (2013.01); *B32B 2307/724* (2013.01); *B32B 2457/10* (2013.01); *B32B 2571/00* (2013.01); *H01M 2200/20* (2013.01); *H01M 2220/20* (2013.01)

(58) Field of Classification Search
CPC ......... H01M 50/3425; H01M 2200/20; H01M 2220/20; H01M 50/124; H01M 50/24; H01M 50/249; H01M 50/383; H01M 50/394; B32B 5/022; B32B 5/026; B32B 5/26; B32B 7/12; B32B 2262/10; B32B 2262/101; B32B 2262/144; B32B 2307/306; B32B 2307/724; B32B 2457/10; B32B 2571/00; F16L 59/026; F16L 59/029; Y02E 60/10
See application file for complete search history.

(56)            References Cited

U.S. PATENT DOCUMENTS

| | | | |
|---|---|---|---|
| 6,551,951 B1 | 4/2003 | Fay et al. | |
| 6,670,291 B1 | 12/2003 | Tompkins et al. | |
| 8,541,126 B2 | 9/2013 | Hermann et al. | |
| 10,476,102 B2 | 11/2019 | Fujii et al. | |
| 2003/0170418 A1 | 9/2003 | Mormont et al. | |
| 2006/0068278 A1 | 3/2006 | Bloom et al. | |
| 2008/0009212 A1 | 1/2008 | Levine | |
| 2008/0182097 A1 | 7/2008 | Mochizuki et al. | |
| 2010/0173181 A1 | 7/2010 | Okada | |
| 2010/0239797 A1 | 9/2010 | Alavi | |
| 2011/0159340 A1 | 6/2011 | Hu et al. | |
| 2011/0192564 A1 | 8/2011 | Mommer et al. | |
| 2011/0195291 A1 | 8/2011 | Yokoyama et al. | |
| 2012/0219839 A1 | 8/2012 | Kritzer et al. | |
| 2012/0225331 A1* | 9/2012 | Tartaglia ............. | H01M 50/229 |
| | | | 429/50 |
| 2015/0030804 A1 | 1/2015 | Baser | |
| 2016/0099442 A1 | 4/2016 | Kanayama | |
| 2017/0301965 A1 | 10/2017 | Kato et al. | |
| 2018/0309107 A1 | 10/2018 | Widener | |
| 2019/0207188 A1 | 7/2019 | Miller et al. | |
| 2020/0062920 A1 | 2/2020 | O'Neil et al. | |
| 2020/0099029 A1 | 3/2020 | Du et al. | |
| 2020/0263336 A1 | 8/2020 | Wu et al. | |
| 2021/0074960 A1 | 3/2021 | Stude et al. | |
| 2021/0260850 A1 | 8/2021 | Jin et al. | |
| 2022/0069402 A1 | 3/2022 | Winter et al. | |
| 2024/0429491 A1 | 12/2024 | Stöckmann et al. | |

FOREIGN PATENT DOCUMENTS

| | | | |
|---|---|---|---|
| CN | 202782015 A | | 3/2013 |
| CN | 104169077 A | | 11/2014 |
| CN | 105133189 A | | 12/2015 |
| CN | 105489965 A | | 4/2016 |
| CN | 107146861 | * | 9/2017 |
| CN | 107146861 A | | 9/2017 |
| CN | 107914428 A | | 4/2018 |
| CN | 108609279 | * | 10/2018 |
| CN | 208232487 U | | 12/2018 |
| CN | 109449322 A | | 3/2019 |
| CN | 209822690 U | | 12/2019 |
| CN | 110641101 A | | 1/2020 |
| CN | 210136917 U | | 3/2020 |
| CN | 210200792 U | | 3/2020 |
| CO | 103510670 A | | 1/2014 |
| DE | 621613 C | | 11/1935 |
| DE | 3242900 A1 | | 9/1983 |
| DE | 3219506 A1 | | 12/1983 |
| DE | 3802322 A1 | | 8/1989 |
| DE | 10134145 A1 | | 2/2003 |
| DE | 60105156 T2 | | 7/2005 |
| DE | 60122228 T2 | | 12/2006 |
| DE | 60124578 T2 | | 9/2007 |
| DE | 102007032431 A1 | | 1/2008 |
| DE | 202010017454 U1 | | 1/2012 |
| EP | 0090191 A1 | | 10/1983 |
| EP | 1326745 B1 | | 11/2006 |
| EP | 2090470 A1 | | 8/2009 |
| EP | 3142166 A1 | | 3/2017 |
| EP | 3269540 A1 | | 1/2018 |
| EP | 3395872 A1 | | 10/2018 |
| GB | 2121159 A | | 12/1983 |
| GB | 2568688 A | | 5/2019 |
| JP | 2002-339217 A | | 11/2002 |
| JP | 2005-227227 A | | 8/2005 |
| JP | 5259908 B2 | | 8/2013 |
| JP | 2015-042448 A | | 3/2015 |
| JP | 6233957 B2 | | 11/2017 |
| KR | 10-2008-0064916 A | | 7/2008 |
| KR | 10-2010-0085831 A | | 7/2010 |
| WO | WO 2004/064082 A2 | | 7/2004 |
| WO | WO 2016/092839 A1 | | 6/2016 |
| WO | WO 2017/208952 A1 | | 12/2017 |
| WO | WO 2019/090659 A1 | | 5/2019 |
| WO | WO 2019/121641 A1 | | 6/2019 |
| WO | WO 2020/070275 A1 | | 4/2020 |
| WO | WO 2021/019495 A1 | | 2/2021 |
| WO | WO 2021/022130 A1 | | 2/2021 |
| WO | WO 2022/117500 A1 | | 6/2022 |
| WO | WO 2022/253631 A1 | | 12/2022 |

OTHER PUBLICATIONS

Nanjo, Naoshi "Introduction to FRP Constituent Materials: Chapter 2—Constituent Materials and Types—Glass Fiber—" (Includes Translation) Journal of the Japan Society for Composite Materials; 33,4; pp. 141-149; Dec. 31, 2007.
U.S. Appl. No. 18/564,907, filed Nov. 28, 2023, Stöckmann et al.
Excerpt of the book "Vliesstoffe—Rohstoffe, Herstellung, Anwendung, Eigenschaften, Prüfung" Including Machine Translation; Edited by

(56) References Cited

OTHER PUBLICATIONS

Hilmar Fuchs and Wilhelm Albrecht; WILEY-VCH; pp. 42-44 and 159; Jun. 2009.

International Search Report for International Application No. PCT/EP2018/085432, mailed May 22, 2019.

Written Opinion for International Application No. PCT/EP2018/085432, mailed May 22, 2019.

International Preliminary Report on Patentability for International Application No. PCT/EP2018/085432, mailed Jul. 2, 2020.

Chinese Office Action for corresponding Chinese Patent Application No. 201880082648.4, mailed May 25, 2022.

International Search Report for International Application No. PCT/EP2021/050208, mailed Mar. 24, 2021.

Written Opinion for International Application No. PCT/EP2021/050208, mailed Mar. 24, 2021.

Office Action for U.S. Appl. No. 16/771,906, mailed Mar. 31, 2022.

U.S. Appl. No. 18/038,584, filed May 24, 2023, Stude et al.

U.S. Appl. No. 18/113,382, filed Feb. 23, 2023, Stude et al.

International Preliminary Report on Patentability for International Application No. PCT/EP2021/050208, mailed Jul. 21, 2022.

Notice of Allowance for U.S. Appl. No. 16/771,906, mailed Jan. 26, 2023.

Notice of Reasons for Refusal (Including Translation) for corresponding Japanese Patent Application No. 2020-535106, mailed Oct. 31, 2022.

Action for U.S. Appl. No. 16/771,906, mailed Sep. 29, 2022.

Chinese Office Action (Including Translation) for corresponding Chinese Patent Application No. 201880082648.4, mailed Dec. 12, 2022.

* cited by examiner

MULTI-LAYER PROTECTION ELEMENT FOR A BATTERY

CROSS REFERENCE TO RELATED APPLICATIONS

This application is a national stage application under 35 U.S.C. 371 of PCT Application No. PCT/EP2021/050208 having an international filing date of 8 Jan. 2021, which designated the United States, which PCT application claimed the benefit of German Application No. 10 2020 000 093.2, filed 10 Jan. 2020; German Application No. 10 2020 000 158.0, filed 14 Jan. 2020; German Application No. 10 2020 003 262.1, filed 29 May 2020; German Application No. 10 2020 003 369.5, filed 4 Jun. 2020; and German Application No. 10 2020 004 937.0, filed 13 Aug. 2020, each of which are incorporated herein by reference in their entirety.

The present invention concerns a multi-layer protection element for the in particular thermal insulation of a battery according to the preamble of claim 1, a battery with a multi-layer protection element according to the preamble of claim 10, and a use of a multi-layer protection element according to the preamble of claim 15.

In the present invention, the term "protection element" is preferably to be understood as a flat component with a layered structure, in particular a layer package, which is designed and/or used for the thermal insulation and/or any other shielding of a battery and/or its cells. In particular, the protection element is configured to reduce and/or delay the release of heat to the environment, in particular a vehicle interior, and/or to contain and/or reduce and/or delay the spread of heat in the battery in the event of uncontrolled and/or excessive heat development in the battery.

In the present invention, the term "battery" is to be understood as meaning, in particular, a rechargeable storage element and/or secondary element for providing electrical energy by converting chemical energy. The battery is preferably composed of several interconnected accumulator cells and/or cell blocks, i.e. battery cells.

In particular, the battery is configured as a traction battery and/or for the drive of electric vehicles and/or as a lithium-ion battery. Here, reliable and/or effective thermal insulation is important in order to protect the vehicle occupants in the event of the battery overheating, for example as a result of a traffic accident, at least until the arrival of rescue services.

Due to their chemical composition, lithium-ion batteries in particular exhibit comparatively high instability. If a local short-circuit of the internal electrodes in a battery cell occurs, for example due to contamination of the separator separating the electrodes by trapped foreign particles and/or mechanical action or damage, the strong short-circuit current heats the battery cell up to 800° C. in a short time, sometimes up to 1300° C. This process is known as thermal runaway. The thermal runaway of one battery cell can easily and/or quickly spread to other, adjacent battery cells, especially since the separator loses stability at relatively low temperatures, for example above 120° C., and short circuits can therefore quickly occur in adjacent battery cells. This leads to an unstoppable chain reaction, wherein the energy stored in the battery is released in a short time, usually explosively and/or with the release of toxic gases and with the formation of flames and/or sparks. There is also the risk of the battery bursting when the internal pressure rises accordingly.

WO 2019/121641 A1 discloses a multi-layer protection element for a battery for thermal insulation. The protection element comprises a heat-resistant carrier layer and a heat-resistant, compressible fibre layer. In order to enable pressure equalisation in the event of fire and/or explosion, the battery housing has an outlet which is equipped with a filter or valve.

Thus, it is desirable to keep a battery cell which is located adjacent to a battery subject to thermal runaway and/or overheating as long as possible below a certain limit temperature, preferably 120° C., in particular 80° C. Above 80° C. the aging process of the battery cell is considerably accelerated and above 120° C. the separator in the battery cell often begins to melt, accompanied by irreversible damage and/or short circuits.

Likewise, there is a high demand for efficient and/or long-lasting heat protection of adjacent areas and/or rooms, especially vehicle interiors, against uncontrolled heat development in the battery. In particular, occupants and/or objects should be protected from heat until rescue and/or recovery measures have been fully completed.

In addition, during the rescue operation, the rescuers should also be protected against uncontrolled explosions when the battery is subject to thermal runaway and the risk of toxic gases (e.g. gaseous hydrofluoric acid), sparks and flames escaping should be reduced.

It is an object of the present invention to provide a multi-layer protection element for the in particular thermal insulation of a battery, a battery with such a protection element and a use of the protection element, wherein in case of fire and/or overheating or short circuit a good pressure compensation to prevent the bursting of the battery is made possible with a simple, low-cost construction and at the same time escaping gases are filtered and/or a leakage of flames and/or sparks is minimized or even prevented.

The above object is achieved by a multi-layer protection element according to claim 1, by a battery according to claim 10 or by a use according to claim 15. Advantageous embodiments are subject of the subclaims.

A first aspect of the present invention is that the proposed protection element comprises in particular a gas-permeability of more than 25 mm/s at a differential pressure of at most 200 Pa and a thickness of at least 3 mm—at least in case of fire and/or when a temperature of 300° C. is exceeded. In the event of fire and/or in the event of a short circuit or elevated temperature—in particular, therefore, in the event of an accident—such a design permits optimum pressure compensation through the protection element, wherein escaping gases are filtered through the protection element or its fibre layer and/or flames and/or sparks occurring in the battery are retained. In particular the carrier layer and thus also the protection element can withstand high mechanical loads and/or pressure differences, which can occur in particular in such a case. In addition, the protection element can thermally insulate the battery and/or its battery cells, in particular in order to at least reduce or delay the thermal runaway of the battery and/or the spread to neighbouring battery cells and/or the effect of heat on the environment, such as a vehicle or a vehicle interior.

According to a second, also independently realizable aspect of the present invention, the proposed protection element preferably comprises a gas flow resistance of less than 100 Pa at a gas flow of at least 50 mm/s and a thickness of at least 3 mm—at least in case of fire and/or when a temperature of 300° C. is exceeded. In the event of fire and/or in the event of a short circuit or elevated temperature—in particular in the event of an accident—such a design permits optimum pressure compensation through the protection element, wherein escaping gases are filtered through the protection element and/or its fibre layer and/or flames and/or sparks occurring in the battery are retained. In particular the carrier layer and thus also the protection element can withstand high mechanical loads and/or pressure differences, which can occur in particular in such a case. In addition, the protection element can thermally insulate the battery and/or its battery cells, in particular to at least reduce or delay the thermal runaway of the battery and/or the spread to neighbouring battery cells and/or the effect of heat on the environment, such as a vehicle or vehicle interior.

According to a third aspect of the present invention, which can also be realised independently, the carrier layer is preferably connected or bonded to the fibre layer only partially or via a gas-permeable and/or thermally unstable connection layer. This enables optimum pressure compensation through the protection element in the event of a fire and/or in the event of a short circuit or increased temperature—in particular, thus, in the event of an accident—wherein escaping gases are filtered through the protection element and/or its fibre layer and/or flames and/or sparks occurring in the battery are retained. In particular the carrier layer and thus also the protection element can withstand high mechanical loads and/or pressure differences, which can occur in particular in such a case. In addition, the protection element can thermally insulate the battery and/or its battery cells, in particular to at least reduce or delay the thermal runaway of the battery and/or the spread to neighbouring battery cells and/or the effect of heat on the environment, such as a vehicle or vehicle interior.

According to a fourth, also independently realisable aspect of the present invention, the fibre layer is preferably designed as a non-fabric ply (non-woven) or provided therewith, in particular in the form of a needled fibre fleece and/or a knitted mat, wherein the fibre layer, mat and/or ply is sewn. This enables and/or achieves improved cohesion and/or simplifies processing, manufacture, assembly and/or use.

It is particularly preferred that the fibre layer is formed of long fibres of more than 30 mm in length and/or of a needled and/or bonded non-woven. The long fibres and/or the needling and/or bonding of the fibre layer significantly increase the mechanical resistance compared to another fibre layer. As a result, the fibre layer is particularly stretchable and pressure-elastic, which enables the absorption of high-pressure forces. At the same time, the fibre layer has a high thermal insulation capacity, as the intertwined fibres efficiently reduce the passage of thermal energy through the fibre layer. This is particularly advantageous in the event of uncontrolled heat generation within the battery, for example when a thermal runaway of a battery cell occurs, as this significantly delays the complete destruction and/or explosion of the battery. Finally, needled non-wovens have a low mass per unit area, which facilitates handling.

Preferably, the fibre layer is made of needled and/or bonded glass fibres or silicate fibres or a mixture thereof.

Particularly preferably, the fibres of the fibre layer have a length of at least 40 mm, preferably at least 50 mm, in particular essentially 50 to 60 mm. This allows a particularly high pressure and tear resistance of the fibre layer.

In particular, the fibres have an average diameter of at least 4 μm, preferably at least 5 μm, in particular 6 to 15 μm.

The fibre layer is particularly preferred to be binder-free and/or free of melt beads.

Preferably, the fibre layer and intermediate ply, respectively, has a mass per unit area of less than 1800 g/m², preferably less than 1300 g/m², in particular less than 600 g/m², and/or more than 150 g/m², preferably more than 200 g/m², in particular more than 300 or 400 g/m². This enables easy handling.

In particular, the mechanical stability of the protection element can be significantly increased and/or improved by using a fabric as carrier layer. This is particularly advantageous as mechanical protection in the event of an explosion of a battery cell.

Preferably, the protection element is designed to be highly air-permeable and/or gas-permeable, in particular wherein the carrier layer comprises or is formed by the fabric. This may reduce the risk of explosion and/or bursting of a battery encased and/or surrounded by one or more protection elements, as explosive gases can thus be dissipated very easily through the carrier layer and the fibre layer.

The protection element comprises in particular a dielectric strength of more than 20 kV/mm, preferably more than 30 kV/mm, in particular 40 to 70 kV/mm. This avoids and/or delays the formation of arcs or sparks.

In particular, the protection element—preferably when installed—is less than 7 mm, preferably less than 6 mm, in particular between 2 and 3 mm, thick. This allows a flexible and easy installation in the battery, even in narrow installation gaps.

In particular, the protection element comprises on at least one flat side an adhesive layer—in particular only partially covering it—or is designed to be self-adhesive at least in sections on one flat side. This allows the protection element to be easily arranged and/or attached to or in the battery and/or further protection elements.

Preferably, the protection element has a mass per unit area of less than 1800 g/m², preferably less than 1300 g/m², in particular less than 1000 g/m², and/or more than 150 g/m², preferably more than 200 g/m², in particular more than 300 or 400 g/m².

The thermal conductivity of the protection element at 25° C. room temperature is less than 0.1 W/mK, preferably less than 0.08 W/mK, in particular less than 0.04 W/mK.

A proposed battery, preferably a lithium-ion accumulator, in particular in the form of a traction battery for an electric vehicle, comprises a housing and at least one multi-layer protection element which is arranged in and/or on the housing, in particular for thermal insulation and/or fire protection.

According to a fifth aspect of the present invention, the protection element of the proposed battery is preferably designed according to one of the aspects mentioned before. This leads to advantages for the battery as explained above.

According to a sixth aspect of the present invention, which can also be realised independently, the protection element of the proposed battery is preferably arranged between the housing and at least one battery cell of the battery and covers an outlet of the housing in order to filter gases escaping through the outlet in case of fire and/or in case of a short circuit and/or to minimise or even prevent the escape of flames and/or sparks through the outlet. This again results in the advantages already mentioned, wherein in particular also a simple construction and/or assembly of the battery is made possible.

Preferably, the protection element closes and/or insulates the battery or battery cells or the housing—outside or inside—on the top surface and/or laterally at least partially, preferably completely or over the entire surface. This allows effective heat insulation of the battery towards the top and/or towards an area located above and/or adjacent to the battery, in particular a vehicle interior of a vehicle. In this way, persons, occupants and/or objects in the area and/or room are protected effectively and/or for a sufficiently long time—i.e. until rescue and/or recovery measures have been completed—from uncontrolled heat development in the battery.

According to a seventh, also independently realizable aspect of the present invention, preferably several or all battery cells of the battery are encased/jacketed by the or each one protection element, i.e. in particular individually encased/jacketed. The protection element is particularly preferred to be adapted to the respective battery cell in its shape. For example, sleeve-shaped protective elements can also be provided for cylindrical battery cells. This provides very good thermal insulation, with a simple design and at the same time good gas-permeable in case of fire and/or explosion and/or in case of a short circuit.

For example, the protection element is arranged between two neighbouring battery cells in the housing and can thermally insulate them from each other. In this way, spreading of thermal runaway from one battery cell to the next and/or neighbouring battery cell is effectively delayed and/or contained and/or even prevented, thus preventing or at least significantly delaying the explosive release of heat and/or fragments from the battery.

In the proposed battery, it is particularly advantageous if the protective element comprises at least one carrier layer of a fabric.

According to an eighth aspect of the present invention, which can also be realised independently, a multi-layer protection element, which is designed in particular according to one of the above aspects, is used for the thermal insulation of a battery and/or for the filtration of gases escaping through an outlet of the battery in the event of fire and/or in the event of a short circuit and/or for preventing the escape of flames and/or sparks through the outlet, wherein the protection element is arranged between a housing and at least one battery cell of the battery and covers the outlet on the inside. With a very simple construction and assembly of the battery, an optimum pressure compensation through the protection element is thus enabled, wherein escaping gases are filtered through the protection element and/or its fibre layer and/or flames and/or sparks arising in the battery are retained. In particular the carrier layer and thus also the protection element can withstand large mechanical loads and/or pressure differences, such as can occur in the event of an accident and/or short circuit. In addition, the protection element can thermally insulate the battery and/or its battery cells, in particular in order to at least reduce or delay the thermal runaway of the battery and/or the spread to neighbouring battery cells and/or the effect on the environment, such as a vehicle or vehicle interior.

According to a ninth, also independently realizable aspect of the present invention, the proposed protection element is most preferred to be used and/or arranged for insulation between one or more battery cells on the one hand and a control device and/or control electronics of the battery on the other hand, in particular within a housing of the battery. This can again result in an optimized insulation and/or in the fact that the battery remains stable for longer than usual even in case of a thermal runaway.

Figure 1B:
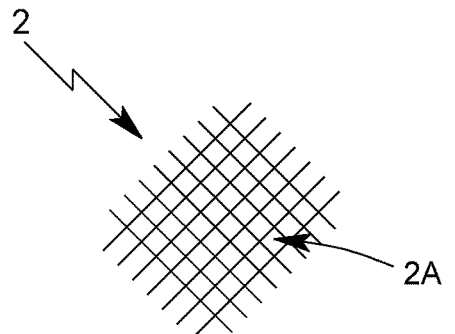
Figure 1C:
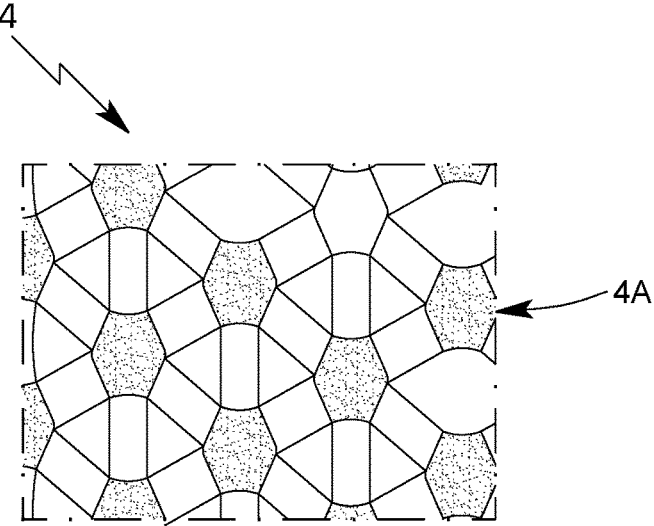
Figure 2:
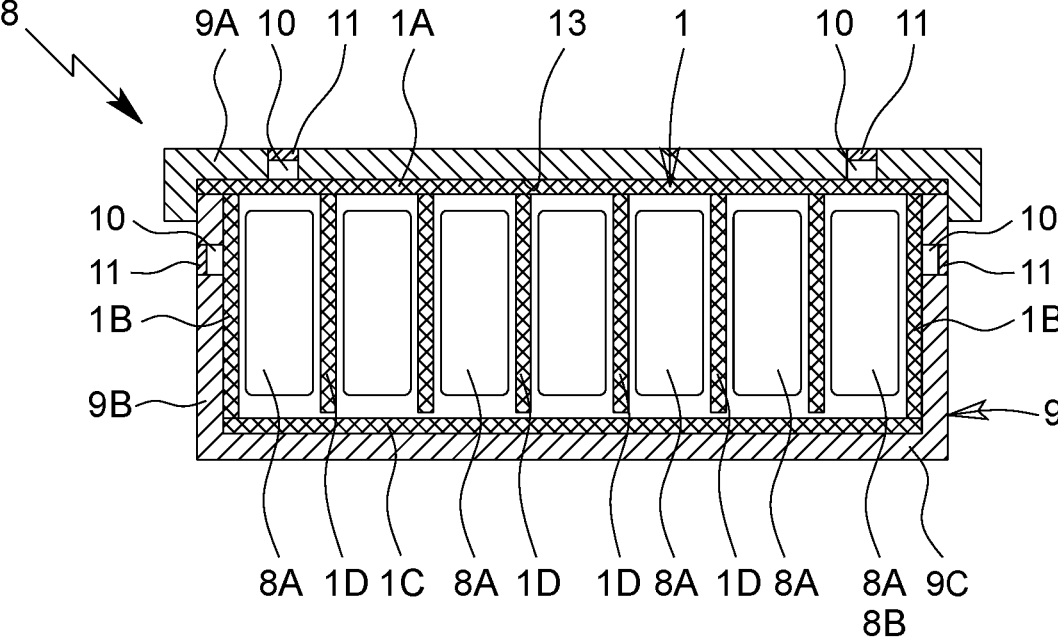
Figure 3:
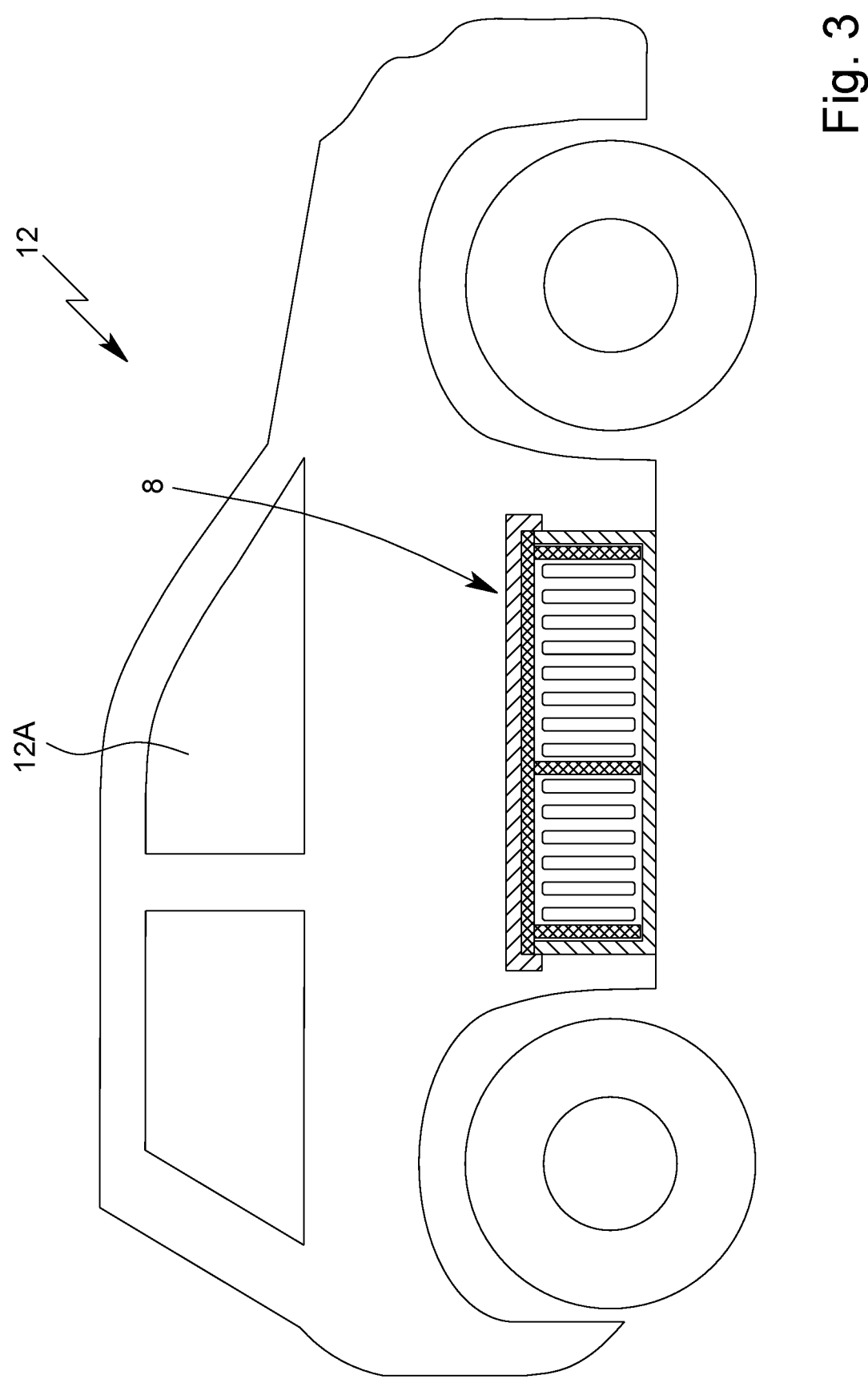

The above-mentioned aspects and features of the present invention as well as the aspects and features of the present invention resulting from the claims and the following description can basically be realised independently of each other, but also in any combination and/or sequence. Additional advantages, features, properties and aspects of the present invention result from the claims and the following description of a preferred embodiment based on the drawing. It shows:

FIG. 1A a schematic section of a proposed multi-layer protection element;

FIG. 1B a schematic representation of a carrier layer in the form of a fabric;

FIG. 1C a schematic representation of a potential bonding and/or adhesive layer;

FIG. 2 a schematic section of a proposed battery with the protection element; and FIG. 3 a schematic section of a vehicle with the proposed battery.

FIG. 1A shows in a schematic, not to scale sectional view a proposed multi-layer protection element 1. The protection element 1 is used for thermal insulation in particular and/or for shielding off a proposed battery 8, which is shown in FIG. 2 in a schematic, not to scale sectional view. The battery 8 (accumulator) is in particular designed as a lithium-ion accumulator, and/or intended for a vehicle 12, as indicated in FIG. 3.

Most preferred, the battery 8 serves as a drive battery or traction battery for the vehicle 12, which is preferably designed as an electric car and/or electric vehicle.

However, the protection element 1 and/or the present invention is also generally applicable and/or usable for the protection of batteries, e.g. in the medical field, for battery-operated electrical appliances, such as leaf blowers, hedge trimmers or brushcutters, and e.g. in the military or for other purposes for the protection of persons carrying batteries on or near the body.

In the following, the preferred structure of protection element 1 is described in more detail.

The protection element 1 comprises a carrier layer 2, and a fibre ply or fibre layer 3.

The layers 2 and 3 are preferably connected to each other, in particular adhesively bonded, in particular by means of a connection or connection layer 4 formed and/or arranged in-between. This facilitates handling and installation and/or assembly in particular.

The protection element 1 preferably, but only optionally, comprises an additional carrier layer 5 on the flat side of the fibre layer 3 facing away from the (first) carrier layer 2, as indicated in FIG. 1A. The additional carrier layer 5 can be designed to correspond to the (first) carrier layer 2, so that the descriptions and explanations for the first carrier layer 2 apply accordingly. However, the additional carrier layer 5 may be designed differently and optionally still comprise corresponding properties or features.

The additional carrier layer 5 is preferably firmly connected or adhesively bonded to the fibre layer 3, in particular via an (additional) connection and/or connection layer 6, as indicated in FIG. 1A. This connection and/or connection layer 6 may in particular be designed exactly the same or similar to the (first) connection and/or connection layer 4, so that the following explanations and features in this regard correspond in particular.

The connection and/or connection layer 4 and/or 6 can in particular be designed as partial bonding 4A as indicated in FIG. 1C. Most preferred is a net-like application or arrangement of bonding areas or connecting areas which connect the carrier layer 2 and/or 5 with the fibre layer 3. In this way, a partial and/or punctual, flat connection of the carrier layer 2 and/or 5 with the fibre layer 3 can be realised with high gas-permeable properties, even if the carrier layer 2 and/or 3 is connected with the fibre layer 3 flat and/or on the flat side.

As an alternative or in addition to the connection and/or adhesively bonding, a thermally unstable adhesive and/or a thermally unstable connection and/or connecting foil can also be used to achieve high gas-permeable properties at elevated temperatures, in particular at temperatures of more than 200° C., preferably more than 250° C., most preferred more than 300° C.—as explained in more detail later.

The carrier layers 2 and/or 5 and the fibre layer 3 are connected in particular by adhesive bonding. However, other joining techniques, such as sewing or welding, are also possible.

The protection element 1 and/or the carrier layer 2 or 5 optionally comprises an adhesive layer 7, in particular only applied partially or punctually, and/or is designed to be self-adhesive in order to facilitate and/or enable the fastening and/or assembly of the protection element 1 to and/or in the battery 8 and/or its housing 9.

The carrier layer 2 and/or 5 preferably comprises or is formed from a gas-permeable fabric 2A as schematic illustration in FIG. 1B. This is beneficial for a high mechanical load-bearing capacity, wherein a compact design with low thickness is possible.

The term "fabric"/"woven fabric" refers in particular to a preferably flat product formed by a plurality of threads crossing each other. The threads are guided over and under crosswise threads, in particular in a repetitive sequence.

The fabric 2A is preferably a glass fibre fabric, aramid fabric, carbon fibre fabric or silicate fabric. It is also possible that the fabric 2A is a mixture fabric and/or comprises or consists of a mixture in particular of glass fibres, carbon fibres, aramid fibres and/or silicate fibres.

Most preferred for connection of the fabric 2A forming a carrier layer 2 and/or 5 with the fibre layer 3 is an air-permeable and/or gas-permeable adhesive, wherein the adhesive allows the escape and/or passage of gases, but the fabric 2A and/or the fibre layer 3 forms a barrier to sparks or flames.

Preferably the fabric 2A comprises a high heat resistance, preferably up to a temperature of about 1150° C. or above 1150° C.

The fabric 2A preferably comprises a minimum mesh size of 0.1 mm and/or maximum mesh size of 0.4 mm. For example, the most preferred mesh sizes are about 0.114 mm, about 0.22 mm or about 0.315 mm.

The fabric 2A preferably comprises an open screen area of at least 10%, in particular at least 20%, more preferably at least 30%, and/or at most 45%, in particular at most 50% or 60%.

The carrier layer 2 and/or 5 preferably forms a cover layer or outer layer of the fibre layer 3 and/or the protection element 1.

Optionally, at least one of the carrier layers 2, 5 is designed as a heat-resistant metal layer or ply, preferably aluminium and/or aluminium foil, or as a mica layer, preferably mica paper layer.

The mica layer is preferably provided or reinforced with a scrim and/or the fabric 2A and/or reinforcement fibres or vice versa, particularly preferred on the side facing to or facing away from the fibre layer 3 or next battery cell 8A.

In particular the carrier layer 2 and/or 5 and/or its basic structure, such as the scrim or fabric 2A, may also be provided or combined with a heat-resistant and/or heat-insulating material, such as mica.

For example, one and/or the first carrier layer 2 is designed as a heat-resistant mica layer, preferably mica paper layer, and the other and/or the second carrier layer 5 is designed as a metal layer, preferably aluminium foil or metal fabric. However, both cover layers 2, 3 can also be designed identically, in particular as mica layer, preferably mica paper layer. This enables a particularly high heat resistance.

Preferably, at least one carrier layer 2 or 5 comprises such a mechanical stability that no fragments can penetrate the protection element 1 in the event of an explosion of battery 8.

Most preferred, the protection element 1 comprises a high degree of gas-permeability.

In particular, the protection element 1 comprises a gas-permeability—measured in particular in terms of the flow velocity—of more than 25 mm/s at a differential pressure (pressure loss) of 200 Pa or at most 200 Pa and at a thickness of 3 mm or at least 3 mm.

The preferred gas-permeability of more than 25 mm/s does not have to be fulfilled for the complete range of differential pressure up to 200 Pa, but is met if the value of more than 25 mm/s is achieved e.g. with a pressure loss of 150 Pa, but not below. The same applies with regard to the thickness range of at least 3 mm. If the protection element 1 shows the gas-permeability of more than 25 mm/s for example at a thickness of 3.5 mm, but not above, it does show the desired gas-permeability.

In particular, the protection element 1 comprises preferably a gas-permeability of more than 25 mm/s at a differential pressure (pressure loss) of 200 Pa, wherein the protection element 1 has a thickness of 3 mm.

Most preferably, the protection element 1 comprises a gas-permeability of more than 25 mm/s, in particular more than 40 mm/s, at a differential pressure (pressure loss) of (about) 200 Pa in the uncompressed or delivery state and/or in the compressed or mounted state, in particular independent on the actual thickness.

Preferably, the protection element 1 comprises a gas-permeability of less than 500 mm/s, in particular less than 400 mm/s, most preferred less than 300 mm/s, at a differential pressure (pressure loss) of 200 Pa or less and independent on the thickness or with a thickness of 3 mm or more.

The gas-permeability is measured preferably at a (defined) measuring temperature of the air flow, wherein the downstream side preferably has normal pressure.

The protection element 1 is preferably uncompressed when measuring the gas-permeability, but can alternatively be compressed in particular corresponding to the desired installation situation and/or with 25 kPa in the thickness direction.

The gas-permeability mentioned is preferably achieved and/or measured at a measuring temperature of the air flow in the normal range of at least 20° C. and at most 25° C.

According to a design variant with an in particular thermally unstable connection and/or adhesive bonding of carrier layer 2 and/or 5 with the fibre layer 3, the gas-permeability is determined at room temperature or in the normal range mentioned above. Before the measurement, the protection element 1 is exposed to a treatment temperature of at least 400° C. or 300° C., preferably at least 250° C. and most preferred at least 200° C., in particular for about 30 or 60 min. Afterwards the gas-permeability is measured at the preferred measuring temperature of 20 to 25° C., as described above.

Preferably and/or alternatively, the gas-permeability is measured and/or reached at the latest at the end of a measuring time and/or flow time of 30 s or 60 s, in particular if protection element 1 has not previously been preheated to the said treatment temperature, is directly exposed to and measured with warm air of e.g. at least 250° C., preferably at least 300° C. and in particular at least 400° C.

Alternatively, the protection element 1 can first be preheated for the measurement to a desired preheating temperature, e.g. 300° C., 400° C. or 450° C., for a certain preheating time, e.g. 1 h, and afterwards the gas-permeability can be measured at the desired measuring temperature or the preheating temperature as explained.

As an alternative to the above-mentioned determination of the gas-permeability by measuring the flow velocity through the protection element 1 at a given differential pressure, the gas-permeability can also be determined by measuring the gas flow resistance (differential pressure or pressure loss) at a given flow velocity. This gas flow resistance or pressure loss/drop behaves inversely to the gas-permeability or flow velocity.

Alternatively or additionally, the protection element 1 preferably comprises a gas flow resistance (pressure loss) of less than 100 Pa at a gas flow rate of 50 mm/s or at least 50 mm/s and with a thickness of 3 mm or at least 3 mm. Alternatively or additionally, the protection element 1 preferably comprises a gas flow resistance (pressure loss) of less than 500 Pa at a gas flow rate (velocity) of 500 mm/s or at least 500 mm/s and with a thickness of 3 mm or at least 3 mm. The measurement is realized as explained above, wherein instead of the flow velocity, the pressure loss/drop is now determined and the flow velocity is held constant, in particular at a desired value. The other measuring conditions are similar, i.e. the measurement is carried out with air at the appropriate temperatures and conditions.

The protection element 1 shows the desired gas flow resistance of less than 100 Pa even if this value is achieved for example at a gas flow rate of 550 mm/s, but not above, and/or at a thickness of 3.2 mm, but not above.

The protection element 1 comprises preferably a gas flow resistance (pressure loss) of more than 10 Pa at a gas flow rate of 50 mm/s and with a thickness of 3 mm.

Preferably, the protection element 1 consists only of two functional layers 2 and 3 or three functional layers 2, 3 and 5. In this context, the term "functional layer" has to be understood that the respective layer provides a significant filter function as fibre layer 3 and/or protection function (burst protection) as carrier/fabric layer 2 in case of an accident, runaway, explosion or the like. This does not exclude that the protection element 1 may comprise non-functional layers in addition, such as the connection layer(s) 4, 6 and/or the adhesive layer 7 or the like.

The protection element 1 and/or the layers 2 or 5 and 3 is and/or are preferably designed to be heat-resistant, in particular up to at least 200° C., most preferred above 250° C., 500° C. or 1000° C., wherein the layer 4/6, connection and/or adhesive bonding of the carrier layer 2 and/or 5 to the fibre layer 3 need not comprise this heat resistance.

The term "heat-resistant" in the sense of the present invention is preferably used to describe the resistance or durability of a material or component to high temperatures or the temperatures mentioned.

In particular, the temperatures specified for heat resistance represent preferred minimum values of the melting temperature, or particularly preferred lower limits of 0.8 or 0.9 times the melting temperature, and/or preferred upper application temperatures in the sense explained below and/or refer in particular to the base material, e.g. in the case of fibre layer 3 in particular to its fibres or in the case of carrier layer 2 e.g. to its fabric 2A, respectively with or without coating or sizing (of the fibres).

A material or component, in particular the protective element 1 and/or one of the layers 2, 3, 5, is heat-resistant (up to an upper application temperature) in the sense of the present invention, in particular, if up to this application temperature, it can maintain its properties—for example its dielectric strength, its mechanical stability or shape, its strength or deformability or the like—or does not change them to such an extent that it is no longer suitable for the desired application (in this case the sealing or insulation and/or electrical or thermal insulation of the battery or battery cells, in particular in case of an accident or thermal runaway).

In particular, carrier layer 2 or 5 is to be regarded as heat-resistant within the meaning of the present invention if it is made of or contains metal, mica or mica paper or a fabric 2A of glass, silicate and/or ceramic microfibres or a mixture thereof.

In particular, fibre layer 3 shall be regarded as heat-resistant within the meaning of the present invention if it is made of or contains glass, silicate and/or ceramic fibres or a mixture thereof.

Preferably, a material or component, in particular the protective element 1 and/or one of the layers 2, 3 or 5, is heat-resistant if it meets the requirements of one of the insulation material classes according to DIN EN 60085: 2008-08, in particular insulation material class F, H, N or R of this standard.

The protection element 1 is designed in particular as a flat layer package and/or in particular is designed to be both compressible and pliable.

The term "pliable" is preferably understood to mean a sufficiently low bending stiffness of the protection element 1, wherein the bending stiffness is a measure of the resistance of an acting force to bending deformation for a component and/or the protection element 1. The bending stiffness is preferably determined according to ISO 5628, preferably ISO 5628:2019. For this purpose, preferably, a plate-shaped protection element 1 with a certain dimension, for example with a thickness of 6 mm and a size of 60 mm×40 mm, is clamped in a rotatable clamping device. The free end of the protection element 1 touches a sensor of a load cell, via which a corresponding contact force is recorded when the clamping device is rotated. In particular, the sensor contacts the free end of the heat insulation element 1 at a distance of 50 mm from the clamping point. The bending stiffness is determined in particular by the force measured at the sensor when the protection element is bent by 15°.

Preferably, the protection element 1 has a bending stiffness determined in this way of less than 10 N, preferably less than 5 N, in particular less than 1 N.

The proposed protection element 1 and/or the fibre layer 3 is preferably compressible and thus allows adaptation to the installation conditions, in particular between individual battery cells 8A and/or between battery cells 8A and the housing 9.

Most preferred is an installation with a certain pretension and/or compression of the protection element 1 and/or the protection elements 1 in the installed condition. The preferred compression is at least 20 kPa and/or more than 25 kPa when installed.

Some battery cells 8A expand and contract as a function of the state of charge. The protection element 1 is designed in particular in such a way that such a "breathing" of the battery cells 8A can be compensated.

In particular, protection element 1 is designed to withstand a compression pressure of at least 200 kPa, most preferred at least 250 kPa or more. This is beneficial to the possible "breathing" of the battery cell 8A and/or a high load capacity in the event of a fire, short circuit, accident or the like.

The term "compressible" is preferably understood to mean a sufficiently low compression hardness of the protection element 1, the compression hardness representing a pressure required to compress a test specimen and/or the protection element 1 by 40% of its original thickness. The compression hardness is preferably determined in accordance with DIN EN ISO 3386, preferably ISO 3386-1:1986, using a plate-shaped heat insulation element 1 with a thickness of 5 mm and a size of 300 mm×200 mm as the test specimen and an aluminium plate with a thickness of 20 mm and a size of 190×80 mm as the indenter.

Preferably, the protection element 1 and/or the fibre layer 3 has a compression hardness determined in the aforementioned way of less than 40 kPa, preferably less than 30 kPa, in particular less than 20 kPa.

Preferably the protection element 1 and/or the fibre layer 3 is highly elastically compressible (in the thickness direction, i.e. perpendicular to the surface extension), most preferred at least in a range of at least 90% to 50% relative to the thickness in the uninstalled state.

The fibre layer 3 is preferably formed from a needled and/or bonded fibre fleece/non-woven. For the purposes of the present invention, the term "needled non-woven" is preferably to be understood as a textile fabric, the fibres of which are randomly intertwined and thereby bonded by dry needling and/or needling without binder and/or melting beads.

The fibre layer 3 is preferably formed from or provided with a non-woven and/or a needled and/or reinforced/bonded fibrous fleece/non-woven and/or a knitted mat.

Preferably, the fibre layer 3 is free of binding agent and/or melt beads.

The fibre layer 3 and/or the fibrous fleece and/or the knitted mat and/or the non-woven is most preferred, as indicated by a 3A thread in FIG. 1A. This can improve the stability and/or processability of the fibre layer 3 and/or the protection element 1.

The optional sewing is preferably done relatively loosely and/or at relatively large distances of one or more millimetres.

Sewing is preferably done before application of and/or lamination with carrier layers 2, 5 or other cover layers, i.e. in particular not with other layers and/or only for its own stabilisation.

Most preferred is sewing with glass fibres, i.e. sewing with a thread 3A of glass fibre(s).

Tests have shown that very good stability and ideal properties can be achieved when a non-woven/fibre fleece and/or knitted fabric is sewn at least essentially with silicate fibres, most preferred with a 3A thread made of glass fibre(s).

The fibre layer 3 can also have a multi-layered/multi-ply design and optionally be sewn and/or provided with an intermediate layer and/or intermediate ply.

The fibre layer 3 is in particular made of glass fibres or silicate fibres or a mixture thereof. For example, glass fibres, in particular of A-,C-,D-, E-, ECR-, S2- or R-glass or mixtures thereof, and/or other heat-resistant fibres may be used.

The fibres preferably have an average diameter of at least 4 μm, in particular at least 5 μm, and most preferably essentially 6 to 15 μm.

The length of the fibres is preferably more than 30 mm, preferably more than 40 mm, in particular essentially 50 to 60 mm. In principle, however, the length of the fibres can also be greater, for example up to about 120 mm.

Preferably, the mass per unit area of the fibre layer 3 is less than 1800 or 1500 g/m$^2$, preferably less than 1300 g/m$^2$, in particular less than 600 g/m$^2$, and/or more than 150 g/m$^2$, preferably more than 200 g/m$^2$, in particular more than 300 or 400 g/m$^2$.

Preferably, the mass per unit area of the protection element 1 is less than 1800 or 1500 g/m$^2$, preferably less than 1300 g/m$^2$, in particular less than 1000 g/m$^2$, and/or more than 150 g/m$^2$, preferably more than 200 g/m$^2$ in particular more than 300 or 400 g/m$^2$.

The protection element 1 preferably has a thickness of less than 15 mm, preferably less than 10 mm, in particular between 3 and 8 mm, in particular in the uncompressed state or delivery state.

Particularly preferably, the protection element 1 has a dielectric strength of more than 20 kV/mm, preferably more than 30 kV/mm, in particular of 40 to 70 kV/mm.

The dielectric strength defines the limit of the electrical field within the material up to which a voltage breakthrough (electric arc or electric spark) does not occur.

The dielectric strength is preferably measured according to IEC 60243-1:2013.

The measurement is conducted preferably under normal conditions between 20° C. and 25° C. and preferably with a relative humidity of about 50% and/or with the protection element 1 in its compressed state.

In the following, the proposed battery 8 and an arrangement and/or a use of protection element 1 according to the proposal, in particular of protection elements 1A and 1B according to the proposal and optionally further heat insulation elements 1C and 1D according to the proposal or similar protection elements 1 in the battery 8 is explained in more detail on the basis of FIG. 2.

The protection elements 1A to 1D can be designed identically or differently.

In the following, the protection elements 1A to 1D are also referred to as first protection element 1A, second protection element 1B, third protection element 1C and fourth protection element 1D for differentiation. However, this only serves to differentiate the different protection elements 1 and does not imply that, for example, if the third protection element 1C is provided, a second protection element 1B must also be present.

Preferred is that for power supply the battery 8 is arranged and/or installed in a schematically depicted vehicle 12, especially an electric vehicle. In particular, when installed, battery 8 is located below a vehicle interior 12A, for example a passenger or other interior area of the vehicle 12.

The battery 8 preferably has a housing 9 with an upper housing part and/or housing lid 9A and a housing bottom part. Here, the housing 9 and/or housing bottom part comprises at least one housing side wall 9B and a housing bottom 9C.

The housing 9 preferably consists of a non-conductive material, for example plastic, or of metal.

The battery 8 is preferably designed as a rechargeable accumulator, in particular lithium-ion accumulator. Alternatively, it can also be constructed or designed from or with lithium iron phosphate, lithium cobalt oxide, lithium metal oxide, lithium ion polymer, nickel zinc, nickel metal, nickel cadmium, nickel hydrogen, nickel silver, nickel metal hybrid, all-solid state, lithium air, lithium sulphur and similar systems and/or materials.

In particular, the battery 8 has at least one group of battery cells 8A which are in particular electrically wired and/or housed in housing 9, preferably in the lower housing part 10.

Preferably, the protection element(s) 1 is/are arranged within the interior space of the housing 9 accommodating the battery cells 8A.

Preferably is that at least one protection element 1, in particular a first protection element 1A, is attached and/or fixed, preferably adhesively bonded, especially by means of the adhesive layer 7, preferably above the battery cells 8A and/or in particular on the housing 9 and/or housing lid 9A. The first protection element 1A closes and/or insulates the housing bottom part and/or the battery 8 or its cells 8A preferably on the top side.

In this way, a particularly efficient top-side heat insulation and fire protection against the vehicle interior 12A is achieved, in order to protect persons or objects inside efficiently and/or long enough from uncontrolled heat development in the battery 8.

The battery 8 and/or the housing 9 preferably comprises at least one outlet 10 which—at least in the event of fire and/or excessive heating or a strong pressure increase inside the battery 8—allows gas to escape from the battery 8 and/or the housing 9 to the outside and thus pressure compensation. This prevents the battery 8 from exploding and/or bursting, in particular in the event of fire and/or short circuit and/or overheating.

The outlet 10 is preferably arranged in the housing lid 9A and/or on a top side of the battery 8 and/or the housing 9.

The battery 8 and/or housing 9 preferably comprises several outlets 10 for the escape of gases and/or pressure compensation.

Preferably, the and/or each outlet 10 is/are basically and/or as delivered and/or during normal use or as far as necessary closed or closable, in particular by means of a thermally unstable and/or not pressure-stable element 11, in particular most preferred by means of a bursting disc or the like Instead of the bursting disc, another element or valve can also be used as a closing element 11, for example, which basically encloses the outlet 10 and opens in the event of fire and/or in the event of a short circuit or overheating—preferably automatically depending on pressure and/or temperature. However, other design solutions are also possible.

In the event of fire, short circuit, overheating or other pressure increase in housing 9, pressure compensation can be achieved via outlet 10, in particular after bursting disc and/or opening of the valve, by allowing gas to flow out of housing 9 through outlet 10. The protection element 1 and/or its fibre layer 3 acts as a filter, so that unwanted toxins and gases can be filtered out and/or retained. Furthermore, the protection element 1 serves as a barrier against the escape of flames or sparks through the open outlet 10. In addition, the at least one carrier layer 2 can pick up the mechanical loads that may occur abruptly when the outlet 10 is suddenly opened and/or the battery is subject to thermal runaway, so that the protection element 1 retains its desired filter function and safety function against the escape of flames, especially in the aforementioned case of gas flowing out through the outlet 10. This load-bearing capacity of the protection element 1 is supported by the preferably intended high gas-permeability and in particular the beneficial design of at least one separating layer 2 as fabric 2A.

In the illustration example, the housing 9 comprises one or more outlets 10 in particular in the housing lid 9A, which is or are preferably covered on the inside by the protection element 1 and/or first protection element 1A.

Alternatively or additionally, the battery 8 and/or the housing 9 and/or at least one housing side panel 9B may also comprise one or more lateral outlets 10 as shown in FIG. 2. In this case, in particular in addition or as an alternative to the first protection element 1A, the further and/or second protection element 1B is/are also provided, which covers the respective side wall 9B and/or the respective lateral outlets 10.

In particular at least one first protection element 1A and at least one second protection element 1B are used, wherein the first protection element 1A encloses and/or thermally insulates the interior of the housing on the top side and the second protection element 1B is arranged laterally on a housing side wall 9B.

Preferably the second protection element 1B is attached, in particular crosswise and/or perpendicularly, to the first protection element 1A, preferably adhesively bonded, needled or welded.

Preferably all side walls 9B of the battery 8 and/or housing 9 are provided or covered on the inside with second protection elements 1B, preferably also independently of outlets 10 formed therein.

The second protection element 1B is preferably also fastened and/or adhesively bonded to the associated side wall 9B, in particular by means of the adhesive layer 7 and/or a self-adhesive version of the respective protection element 1B. However, other constructive solutions are also possible.

The preferred proposed arrangement and inside covering of the outlet or outlets 10 by one or more protection elements 1 allows very easy assembly and construction of the battery 8, which provides the desired pressure compensation in case of fire and/or short circuit or overheating, while ensuring the desired filtering and protection properties at the outlet 10 for use in a vehicle 12.

As an alternative or in addition to the first protection element 1A and/or the second protection element 1B, the battery 8 can comprise a further and/or third protection element 1C, as shown as an example in FIG. 2.

The third protection element 1C is preferably arranged opposite the first protection element 1A and/or on a lower side and/or the bottom 9C inside the housing. Preferably the lower side and/or the bottom 9C is completely and/or completely covered by the third protection element 1C.

The third protection element 1C is preferably fastened and/or adhesively bonded to the bottom 9C by means of the adhesive layer 7 and/or a self-adhesive design. However, other constructive solutions are also possible.

The protection elements 1A-C are preferably each arranged between a battery cell 8A and/or the battery cell 8A and the housing 9.

Preferably in the battery 8 and/or the housing 9 the carrier layer 2 and/or the fabric 2A is arranged on the inside of the protection element 1 and/or the protection elements 1A-C facing the battery cells 8A.

Alternatively or in addition to the protection elements 1A-C, preferably at least one (further and/or fourth) protection element 1D is provided and arranged between the battery cell 8A, whereby these are thermally insulated and/or separated from each other. The protection element 1D is most preferred inserted, pressed in or provided in any other way between the battery cell 8A.

The battery cell 8A are preferably at least substantially fully and/or on all sides encased by one or more 1D protection elements.

The protection element 1 can preferably also compensate for any possible expansion of the cells during charging and/or ensure a mechanical pretension as defined as possible over the service life of the battery 8. At least approx. 25 kPa are required in the delivery condition. Over the service life, the pressure in the installed condition may increase to a maximum of 250 kPa due to the expansion of the cells 8A (swelling). These values vary depending on the cell type (round cell, pouch cell and prismatic cell) and can be adapted to customer requirements.

In particular, the protection elements 1D enclose and/or encase several or all battery cell 8A on all sides and/or in particular in such a way that the battery cell 8A are supported and/or arranged in the housing 9 in such a way that they are insulated, shielded and/or damped with respect to one another. The protection element 1 thus preferably forms a storage mat for the battery cell(s) 8A. In addition to effective thermal insulation, in particular on all sides, this also enables robust and/or resistant storage of the battery cell 8A, since any shocks and/or vibrations are damped and/or absorbed by the compressible protection element 1.

The battery cell 8A are preferably—in groups or individually—at least substantially completely and/or on all sides enclosed and/or surrounded by one or more protection elements 1A-1D, i.e. insulated and/or shielded off from one another in the battery 8.

In the case of cylindrical design of the battery cell 8A, the fourth protection elements 1D can, for example, be designed hollow cylindrical and thus radially surround the battery cell 8A—in particular individually—wherein further protection elements 1, such as the first protection element 1A and the third protection element 1C can, for example, axially cover or seal off the battery cell 8A.

In the case of cell stacks, intermediate layers can also be formed for the axial separation of battery cell 8A from the protection elements 1.

It should be noted that the protection element 1 and/or 1D can in principle and in particular also when arranged between the battery cell 8A—i.e. in particular when not arranged on the outside between the battery cell 8A and housing 9—comprise additional layers, such as a further fibre layer and/or another intermediate layer, separating layer or insulating layer as required and may therefore also have a lower gas-permeability.

Tests have shown that the proposed protection element 1 is suitable both for containing heat within battery 8 and for top side and/or side arrangement and/or insulation, i.e. in particular for thermal protection of adjacent vehicle interiors 12A.

Alternatively or in addition, the proposed protection element 1 can also be used and/or arranged to insulate a control, control device and/or control electronics 8B of the battery 8, in particular in the housing 9 of the battery 8, in particular to insulate it from one or more battery cells 8A, as schematically shown in FIG. 2 on the right side where the control device 8B could be placed e.g. instead of one cell 8A in the battery 8 and/or housing 9. This use or arrangement may also serve, for example, in the event of the failure and/or thermal runaway of a battery cell 8A, to contain heat and/or provide insulation within battery 8 and thus ultimately stabilize battery 8, in particular for a longer time than previously.

Individual aspects of the present invention can, as already mentioned, be combined as desired, but also realised independently of each other.

LIST OF REFERENCE NUMBERS

1(A, B, C, D) protection element
2 carrier layer

16

2A woven fabric/fabric
3 fibre layer
3A thread
4 connection layer
4A partial bonding
5 additional carrier layer
6 connection layer
7 adhesive layer
8 battery
8A battery cell
8B control/control device
9 housing
9A housing lid
9B housing side wall
9C housing bottom
10 outlet
11 (closure) element
12 vehicle
12A vehicle interior

The invention claimed is:

1. A multi-layer protection element for a battery comprising:
   a heat-resistant carrier layer which is heat resistant above 250° C., and
   a fibre layer,
   wherein
   the protection element has a gas-permeability of more than 25 mm/s at a differential pressure of 200 Pa and at a thickness of at least 3 mm.

2. The protection element according to claim 1, wherein the carrier layer comprises a gas-permeable fabric.

3. The protection element according to claim 1, wherein the fibre layer is made of one or more of: glass fibres and silicate fibres.

4. The protection element according to claim 1, wherein the fibre layer comprises a needled fibre fleece.

5. The protection element according claim 1, wherein the protection element is compressible and pliable.

6. The protection element according claim 1, wherein the protection element, on at least one flat side, is, in portions, self-adhesive or has an adhesive layer.

7. The protection element according to claim 1, wherein the protection element consists of two functional layers including the carrier layer as burst protection and the fibre layer for filtering.

8. The protection element according to claim 1, wherein the protection element comprises three functional layers including two carrier layers as burst protection and the fibre layer for filtering.

9. The protection element according to claim 6, wherein the adhesive layer partially covers the protection element.

10. The protection element according to claim 1, wherein the fibre layer is one or more of compressible and heat-resistant above 250° C.

11. The protection element according to claim 1, wherein the protection element has a gas flow resistance of less than 100 Pa at a gas flow rate of 50 mm/s and at a thickness of at least 3 mm.

12. The protection element according to claim 1, wherein the carrier layer is partially connected or partially adhesively bonded to the fibre layer via one or more of a gas-permeable and thermally unstable connection or connection layer.

13. The protection element according to claim 1, wherein the fibre layer comprises a sewn, non-woven layer.

14. The protection element according to claim 1, wherein the protection element has a thickness between 3 mm and 15 mm.

15. The protection element according to claim 1, wherein the protection element comprises said gas-permeability at least in the event of fire and/or when a temperature of 300° C. is exceeded.

16. A multi-layer protection element for a battery comprising:

a heat-resistant carrier layer which is heat resistant above 250° C., and a fibre layer, wherein the protection element has a gas flow resistance of less than 100 Pa at a gas flow rate of 50 mm/s and at a thickness of at least 3 mm.

17. The protection element according to claim 16, wherein the carrier layer is partially connected or partially adhesively bonded to the fibre layer via one or more of a gas-permeable and thermally unstable connection or connection layer.

18. The protection element according to claim 16, wherein the protection element has a thickness between 3 mm and 15 mm.

19. The protection element according to claim 16, wherein the protection element comprises said gas-permeability at least in the event of fire and/or when a temperature of 300° C. is exceeded.

20. A multi-layer protection element for a battery comprising:

a heat-resistant carrier layer which is heat resistant above 250° C., and a fibre layer, wherein the carrier layer is partially connected or partially adhesively bonded to the fibre layer via one or more of a gas-permeable and thermally unstable connection or connection layer.

21. The protection element according to claim 20, wherein the protection element has a thickness between 3 mm and 15 mm.

* * * * *